United States Patent
Dickinson

(10) Patent No.: US 7,849,574 B2
(45) Date of Patent: Dec. 14, 2010

(54) DEVICE AND METHOD FOR LOCKING TOGETHER THE SHAFTS OF AN AUTOMATIC TRANSMISSION DURING INSTALLATION OF SHAFT RETAINING NUTS

(75) Inventor: Michael Dickinson, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1406 days.

(21) Appl. No.: 11/295,990

(22) Filed: Dec. 7, 2005

(65) Prior Publication Data
US 2007/0125194 A1    Jun. 7, 2007

(51) Int. Cl.
*B23P 19/04*    (2006.01)
(52) U.S. Cl. .............................. 29/252; 29/255; 29/278
(58) Field of Classification Search .................... 29/252, 29/251, 253–265, 270–278
See application file for complete search history.

(56) References Cited

U.S. PATENT DOCUMENTS

| | | | |
|---|---|---|---|
| 4,405,163 A | 9/1983 | Voges et al. | |
| 4,656,715 A | 4/1987 | Diaz | |
| 4,740,257 A | 4/1988 | Halls et al. | |
| 5,220,810 A * | 6/1993 | Keltner | 62/292 |
| 5,323,808 A | 6/1994 | Shimizu | |
| 5,810,792 A | 9/1998 | Fangrow, Jr. et al. | |
| 5,839,715 A | 11/1998 | Leinsing | |
| 6,101,811 A | 8/2000 | Nix et al. | |
| 6,886,227 B1 * | 5/2005 | Hedrick | 29/252 |
| 7,669,306 B2 * | 3/2010 | Palka | 29/261 |
| 2007/0125194 A1 * | 6/2007 | Dickinson | 74/607 |

* cited by examiner

*Primary Examiner*—Lee D Wilson
(74) *Attorney, Agent, or Firm*—Jason H. Foster; Kremblas & Foster

(57) ABSTRACT

A device and method used for locking three shafts of an automatic transmission during tightening of a shaft-retaining nut. The device has a housing with a sidewall defining a fluid chamber and a tip at the first end of the housing. A fluid passage extends through the tip from the fluid chamber at one end of the tip and a clutch apply port at a second, opposite end of the tip. A tube, such as a coupling, is mounted to the housing sidewall through which a fluid passage extends in fluid communication with the fluid chamber. A compressed gas conduit is mounted to the coupling and is in fluid communication with the coupling fluid passage. As a park mechanism on the transmission is applied, a predetermined amount of air pressure from the compressed gas conduit is applied through the coupling, housing and tip to the clutch apply port, thereby locking the three shafts of the automatic transmission together. The shaft retaining nuts are tightened and the device can be released, thereby releasing the shaft.

5 Claims, 3 Drawing Sheets

DEVICE AND METHOD FOR LOCKING TOGETHER THE SHAFTS OF AN AUTOMATIC TRANSMISSION DURING INSTALLATION OF SHAFT RETAINING NUTS

BACKGROUND OF THE INVENTION

1. Field of the Invention

This invention relates generally to a device and method for locking three shafts of an automatic transmission and, more specifically, a device and method for tightening shaft retaining nuts of an automatic transmission.

2. Description of the Related Art

The installation of the shaft retaining nuts on at least one particular automatic transmission requires two or more workers. A first worker applies air pressure to the clutch with a hand-held nozzle and a second worker tightens the retaining nuts on the transmission. Alternatively, the workers can lift the transmission off the table and apply a device that bolts the transmission case and splines to the input shaft of the transmission. The use of multiple persons is expensive and some facilities may have a difficult time finding extra helpers to assist with installation of shaft retaining nuts using the conventional methods.

Therefore, it is the object and feature of the invention to provide a device and method for locking three shafts of an automatic transmission that does not require multiple installation technicians.

BRIEF SUMMARY OF THE INVENTION

The invention is a device and method for aiding in the tightening of shaft-retaining nuts of an automatic transmission. The invention includes a housing that has first and second opposing ends with a sidewall defining a fluid chamber. A tip body is mounted to the first end of the housing with a fluid passage extending through the tip body from fluid communication with the fluid chamber at one end of the tip. A second, opposite end of the tip body is in fluid communication with a clutch apply port of the transmission. In addition, a coupling is mounted to the housing sidewall through which a fluid passage extends in fluid communication with the fluid chamber. A compressed gas conduit is mounted to the coupling in fluid communication with the coupling fluid passage.

In operation, as a park mechanism on the transmission is applied, a predetermined amount of air pressure from the compressed gas conduit is applied to the clutch apply port, thereby locking the three shafts of the automatic transmission together. The shaft retaining nuts are tightened manually while the shafts are locked thereby avoiding the need for additional personnel in the task.

Figure 1:
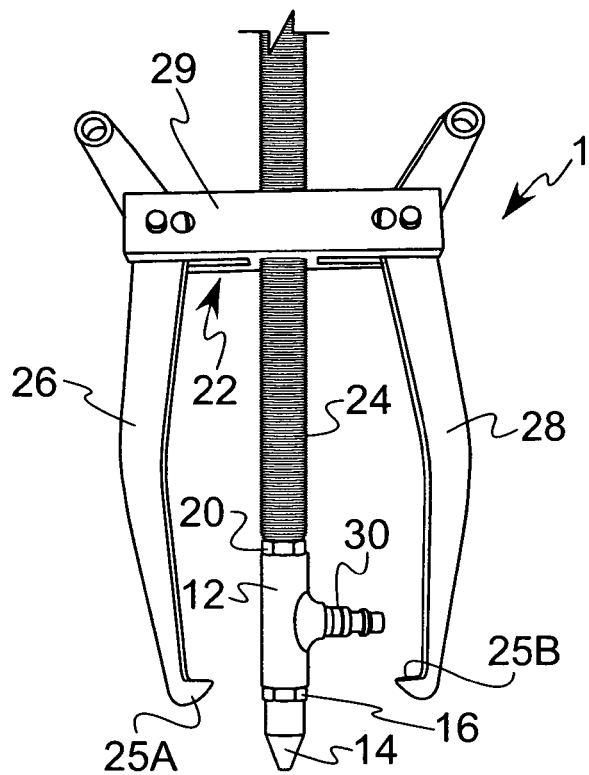
FIG. 1 is a view in perspective illustrating the preferred embodiment of the present invention.

In describing the preferred embodiment of the invention, which is illustrated in the drawings, specific terminology will be resorted to for the sake of clarity. However, it is not intended that the invention is limited to the specific term so selected and it is to be understood that each specific term includes all technical equivalents, which operate in a similar manner to accomplish a similar purpose.

DETAILED DESCRIPTION OF THE INVENTION

The device 10, as illustrated in FIGS. 1-5, is for use with an automatic transmission, for example, when the transmission is going to be installed on a vehicle, or a part is to be installed on the transmission. The device 10 has a housing 12 having first and second opposing ends with a sidewall defining a fluid chamber 11. The housing 12 is preferably circular cylindrical in shape but can be a variety of alternative shapes. The housing 12 is preferably made from steel. As will be recognized by a person having ordinary skill, any suitable material may be used, including aluminum, galvanized steel, plastic or a composite.

Figure 3:
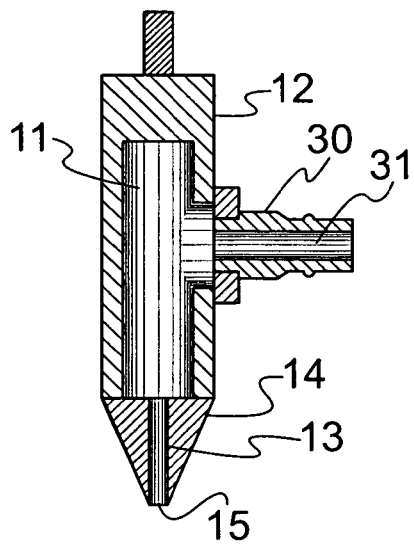
FIG. 3 is a schematic view illustrating the embodiment of FIG. 2.

A tip body, such as the conical tip 14, is preferably at the first end of the housing 12. The tip 14 has a fluid passage 13 that extends axially therethrough and is in fluid communication with the fluid chamber 11 and through which air can pass from the chamber 11 to the opening 15 at the end of the tip 14, as illustrated in FIG. 3. Preferably the conical tip 14 has a hollow threaded shaft (not shown) that is inserted into a threaded passage in the housing 12 and is locked in place with a nut 16, as illustrated in FIG. 1. However, any suitable securing mechanism can be used to hold the conical tip 14 in place. The conical tip 14 is preferably made of rubber or rubber-coated steel, but any of a variety of suitable materials may be utilized to form the conical tip 14.

Figure 6:
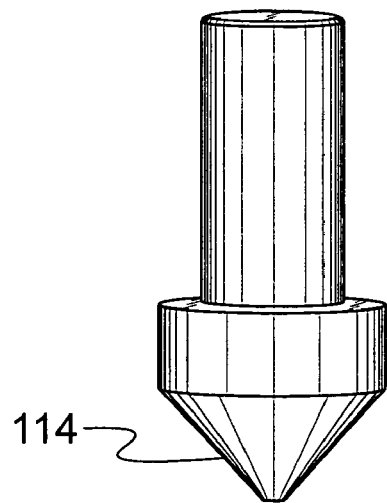
FIG. 6 is a view in perspective illustrating an alternative embodiment of the present invention.
Figure 5:
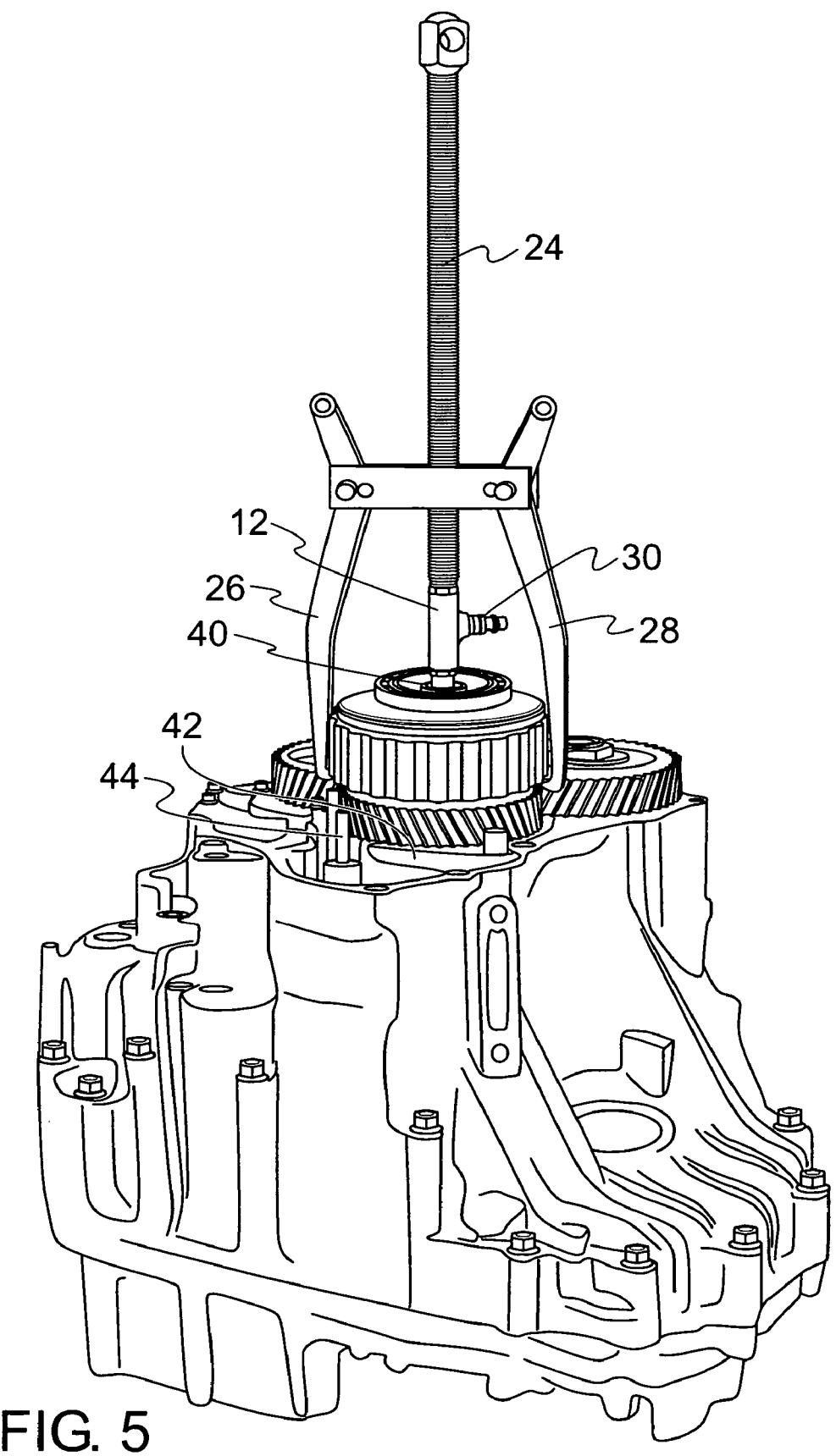
FIG. 5 is a view in perspective illustrating the embodiment of FIG. 1 during operation.

The tip body, which can be shaped differently such as hemispherical, is removably mounted to the housing 12. However, the tip body could be formed integral to the housing 12. In an alternative embodiment illustrated in FIG. 6, a more blunt tip 114 can be used. The shape of the tip body is designed to mate with a clutch apply port and can be modified as needed.

Figure 2:
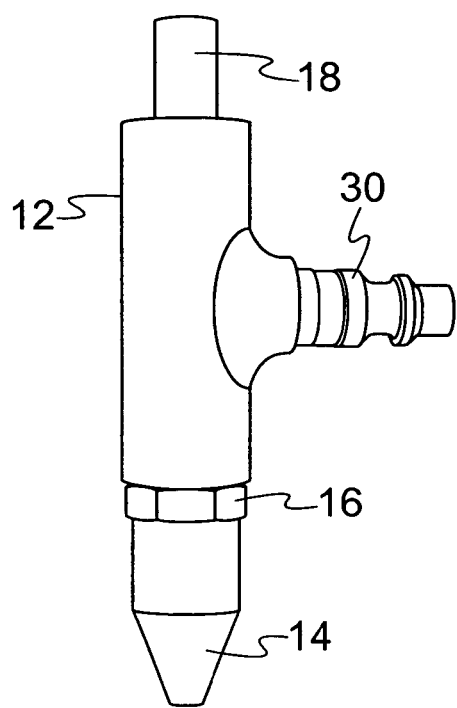
FIG. 2 is a view in perspective illustrating the embodiment of FIG. 1.

A male connection end 18, as illustrated in FIG. 2, is on a second opposite end of the housing 12 as the conical tip 14. The male connection end 18 is inserted into an opening in an end 20 of the threaded shaft 24 of the gear puller 22 (shown in FIG. 1) while permitting rotatable relative motion of the housing 12 and the shaft 24. The threaded shaft 24 extends through a connector plate 29 to which are preferably mounted a pair of arms 26 and 28. There can be more than two arms mounted to the gear puller's connector plate as will be understood by a person of ordinary skill. Each of the preferred arms 26 and 28 has a hook end 25a and 25b for latching onto a variety of gear-like (i.e., disk-shaped) items, such as a clutch housing's peripheral edge, as described below. The gear puller 22 functions in a conventional manner, which will be understood by those familiar with gear-pulling tools.

As shown in FIGS. 1-5, the sidewall of the housing 12 has a coupling 30 attached thereto through which a fluid passage 31 extends that is in fluid communication with fluid inside the fluid chamber 11 of the housing 12. The coupling is a tube with a particular exterior shape to permit a compressed gas conduit 32 to be mounted thereto (FIG. 4) in a known manner for compressed gas hoses with quick-disconnect fittings. Preferably the compressed gas conduit 32 is a compressed air hose. However, any suitable compressed gas conduit can be used and can be mounted in a variety of manners as will be recognized by a person having ordinary skill. Preferably, about 120-150 psi of air pressure is applied to the chamber 11 through the compressed gas conduit 32, but any suitable amount of air pressure can be applied with the device 10, depending upon the requirements to actuate a clutch, as described below. By applying a compressed air hose to the coupling 30, compressed gas can flow through the fluid chamber 11 to the opening 15 of the tip 14.

Figure 4:
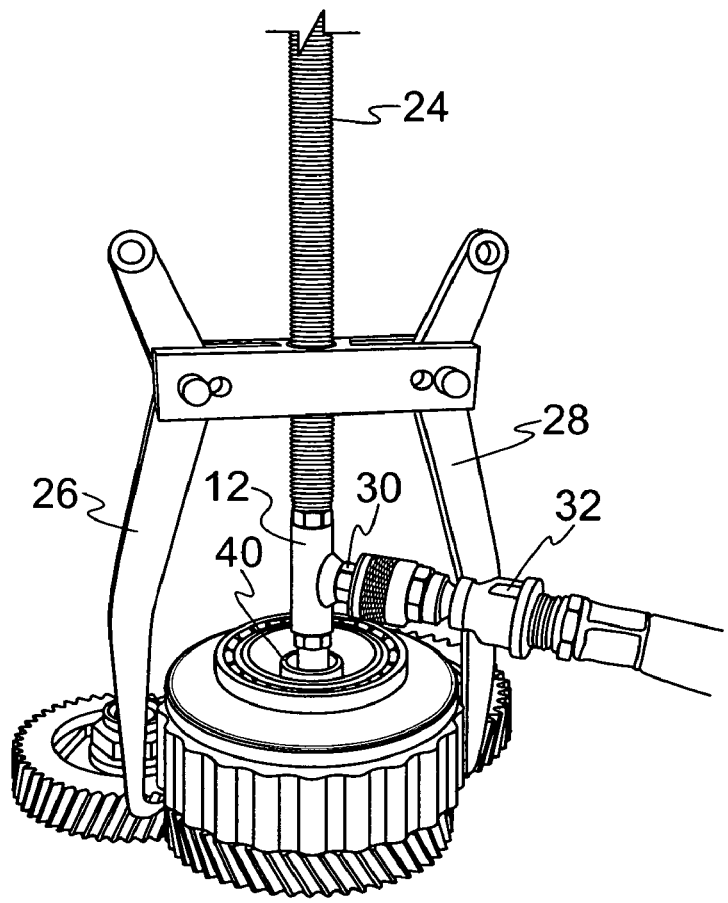
FIG. 4 is a view in perspective illustrating the embodiment of FIG. 1 during operation.

During operation, the conical tip 14 is inserted into a clutch apply port 40, which could be the third clutch of a five clutch automatic transmission, as shown in FIG. 4, and the arms 26 and 28 of the gear puller 22 are hooked around the peripheral edge of the clutch housing 46 at its bottom (in the position illustrated). The shaft 24 is rotated to tighten the tip 14 in place and seat the arms 26 and 28 beneath the clutch housing 46. A parking mechanism 42 is applied by rotating the shaft 44 (shown in FIG. 5), which has the mechanical effect that is understood by those familiar with such transmissions.

Before, while or after the parking mechanism 42 on the transmission is applied, a pre-determined amount of air pressure is applied through the gas conduit 32 to the fluid passage of the coupling 30, which thereby pressurizes the air in the chamber 11, the fluid passage 13 of the tip 14, and, therefore, the apply port 40. The combination of sufficient air pressure in the apply port 40 and the application of the parking mechanism 42 locks the three shafts of the automatic transmission together to allow the shaft retaining nuts to be tightened or any other operation that requires the shafts to be locked. The shaft retaining nuts can be tightened using a conventional tool, such as a wrench or powered tightening device. Once the shaft retaining nuts are tightened, the device 10 can be removed from the apply port 40 by reversing the above steps, and the parking mechanism 42 can be released, thereby releasing the shafts.

The device and method for using the device are advantageous over prior methods and devices because a single installer can use the device to lock the shafts and keep the shafts locked for an indefinite time period. The threaded shaft of the gear puller provides enough force to hold the device in place during application of substantial air pressure. Therefore, a single installer can operate the device and tighten the shaft retaining nuts him or herself, without needing additional help.

While certain preferred embodiments of the present invention have been disclosed in detail, it is to be understood that various modifications may be adopted without departing from the spirit of the invention or scope of the following claims.

The invention claimed is:

1. A combination of an automatic transmission and a device for aiding in the tightening of a shaft retaining nut of the automatic transmission, the combination comprising:
   (a) a housing having first and second opposing ends with a sidewall defining a fluid chamber;
   (b) a tip body at the first end of the housing with a fluid passage extending through the tip body from fluid communication with the fluid chamber at one end of the tip body wherein said tip is conical and in fluid communication with a clutch apply port of the transmission at a second, opposite end of the tip body;
   (c) a coupling mounted to the housing sidewall and through which a fluid passage extends in fluid communication with the fluid chamber; and
   (d) a compressed gas conduit mounted to the coupling in fluid communication with the coupling fluid passage
wherein a second opposite end of the housing is rotatably mounted to an end of a threaded shaft that extends through a connector plate having at least two arms mounted to the connector plate, said arms being removably attached to a clutch housing of the transmission.

2. The combination in accordance with claim 1, wherein the second end of the housing is a male connection end that extends into the threaded shaft.

3. The combination in accordance with claim 1, wherein the sidewall is circular cylindrical.

4. A method for locking three shafts of an automatic transmission during tightening of a shaft retaining nut, the method comprising:
   (a) mounting a tip body to a first end of a housing having a sidewall defining a fluid chamber, the tip body having a fluid passage extending therethrough in fluid communication with the fluid chamber;
   (b) rotatably mounting a second, opposite end of the housing to an end of a threaded shaft that extends through a connector plate having at least two arms mounted to the connector plate;
   (c) connecting a compressed gas conduit to a coupling in the housing sidewall through which a fluid passage extends in fluid communication with the fluid chamber;
   (d) mounting said at least two arms to a clutch housing of the automatic transmission;
   (e) seating the tip body against a clutch apply port;
   (f) applying a predetermined amount of air pressure from the compressed gas conduit to the clutch apply port;
   (g) applying a park mechanism on the transmission; and
   (h) manually tightening at least one shaft-retaining nut.

5. A combination of an automatic transmission and a device for aiding in the tightening of a shaft retaining nut of the automatic transmission, the combination comprising:
   (a) a housing having first and second opposing ends with a sidewall defining a fluid chamber;
   (b) a tip body at the first end of the housing with a fluid passage extending through the tip body from fluid communication with the fluid chamber at one end of the tip body and in fluid communication with a clutch apply port of the transmission at a second, opposite end of the tip body wherein said fluid passage has a diameter that is smaller than a diameter of the fluid chamber;
   (c) a coupling mounted to the housing sidewall and through which a fluid passage extends in fluid communication with the fluid chamber; and
   (d) a compressed gas conduit mounted to the coupling in fluid communication with the coupling fluid passage
wherein a second, opposite end of the housing is rotatably and removably mounted to an open end of a threaded shaft that extends through a connector plate having at least two arms mounted to the connector plate, said arms being removably attached to a clutch housing of the transmission.

* * * * *